United States Patent [19]

Koga et al.

[11] 4,220,180
[45] Sep. 2, 1980

[54] FLEXIBLE PIPE JOINT

[75] Inventors: Tomohiro Koga; Tetsuji Saigusa; Mamoru Kadono, all of Yokohama, Japan

[73] Assignee: Bridgestone Tire Company Limited, Tokyo, Japan

[21] Appl. No.: 974,272

[22] Filed: Dec. 28, 1978

[30] Foreign Application Priority Data

Apr. 18, 1978 [JP] Japan .................... 53-51650[U]

[51] Int. Cl.³ ............................................ F16L 11/00
[52] U.S. Cl. ................................. 138/120; 138/109; 138/155; 138/172; 138/174; 285/229
[58] Field of Search ............... 138/36, 109, 120, 122, 138/155, 172, 174; 285/223, 225, 226, 229, 235

[56] References Cited

U.S. PATENT DOCUMENTS

| | | | |
|---|---|---|---|
| 2,879,804 | 3/1959 | Hammond | 285/229 X |
| 2,998,986 | 9/1961 | Buono | 285/229 |
| 3,139,115 | 6/1964 | Bawcom et al. | 285/229 X |
| 3,305,251 | 2/1967 | Skinner | 285/229 |
| 3,359,014 | 12/1967 | Clements | 285/229 X |
| 3,363,918 | 1/1968 | Fisher | 285/229 |
| 3,429,592 | 2/1969 | Merkwacz | 285/229 |
| 3,453,008 | 7/1969 | Lejeune | 138/109 X |
| 3,688,802 | 9/1972 | Bauman et al. | 138/109 |
| 3,899,006 | 8/1975 | Chompleboux et al. | 138/109 |
| 4,101,150 | 7/1978 | Thawkey et al. | 285/226 |
| 4,147,381 | 4/1979 | Schwarz | 138/155 X |

Primary Examiner—Richard E. Aegerter
Assistant Examiner—James E. Bryant, III
Attorney, Agent, or Firm—Sughrue, Rothwell, Mion, Zinn & Macpeak

[57] ABSTRACT

A flexible pipe joint according to which a pair of spaced apart and opposed hard tubular bodies are interconnected with each other by means of a cylindrical rubber body with a reinforcing layer embedded therein and having an end wound around a core ring, each hard tubular body being provided between its inner end and the core ring with a circumferential rib and reinforcing member.

11 Claims, 5 Drawing Figures

FLEXIBLE PIPE JOINT

BACKGROUND OF THE INVENTION

1. Field of the Invention

This invention relates to a flexible pipe joint comprising a pair of spaced apart and opposed hard tubular bodies and a cylindrical rubber body including a reinforcing layer embedded therein and connecting the pair of hard tubular bodies with each other.

2. Description of the Prior Art

The above mentioned kind of flexible pipe joint has often been used for interconnecting end flanges of a metal pipe line for conveying mud and sand dredged up by a dredging machine. Such conventional flexible pipe joint has the drawbacks that the high pressure used for conveying mud and sand causes the cylindrical rubber body to expand in its radial direction, thereby separating the cylindrical rubber body from the hard tubular body and hence leaking out the medium to be conveyed, that the medium to be conveyed causes the inner surface of the cylindrical rubber body to be severely worn and hence the flexible pipe joint could not be used for a long time, and that a little crack produced on the end flange projected outwardly from the hard tubular body of the pipe joint and used at sea, for example results in a significant acceleration of corrosion of the flange, thereby shortening the life of the flexible pipe joint as a whole.

SUMMARY OF THE INVENTION

An object of the invention, therefore, is to provide a flexible pipe joint which can eliminate the above mentioned drawbacks which have been encountered with the prior art techniques.

A feature of the invention is the provision of a flexible pipe joint comprising a pair of spaced apart and opposed hard tubular bodies, a cylindrical rubber body including a reinforcing layer embedded therein and connecting said pair of hard rubber bodies with each other, a circumferential rib projection outwardly in a radial direction from that position of each of said hard tubular body which is separated outwardly in the axial direction from the inner end of said hard tubular body, and a circumferential reinforcing member embedded in that position of said cylindrical rubber body which is surrounded by the inside surface of the circumferential rib, the outer surface of said hard tubular body, a vertical plane passing the inner end of said hard tubular body and said reinforcing layer.

Further objects and features of the invention will be fully understood from the following detailed description with reference to the accompanying drawings, wherein:

DETAILED DESCRIPTION OF THE PREFERRED EMBODIMENTS

Figure 1:
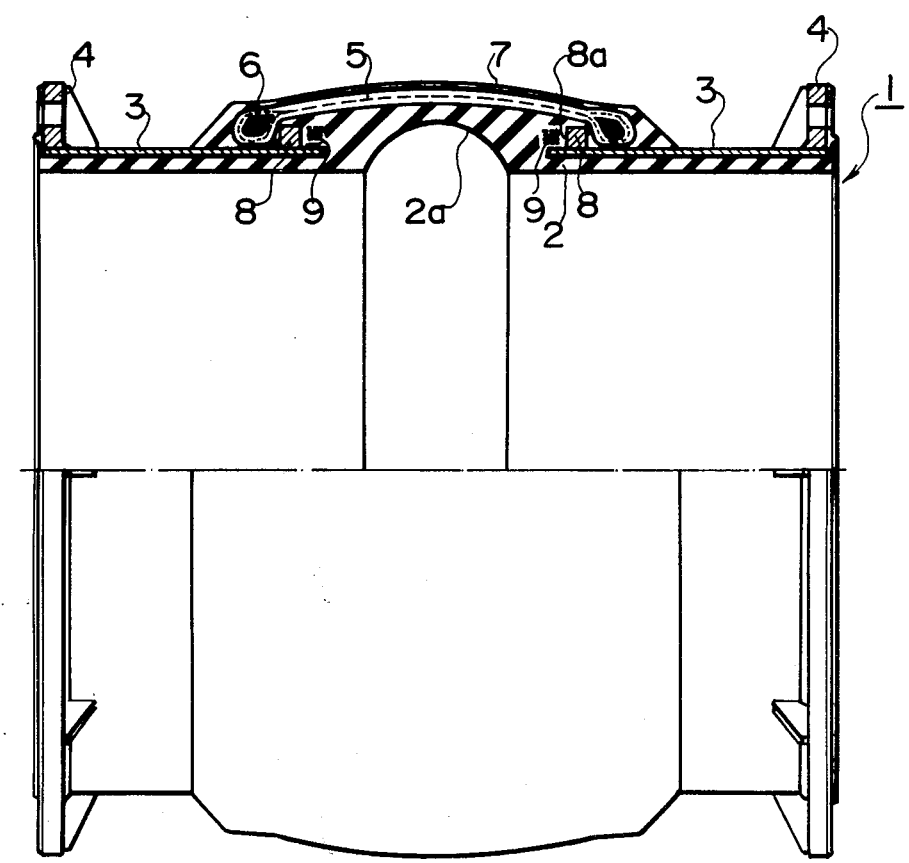
FIG. 1 is a partial cross-sectional view of one embodiment of a flexible pipe joint according to the invention.

Referring to FIG. 1, reference numeral 1 designates a flexible pipe joint and 2 a cylindrical inner surface rubber formed of a wear resistant rubber and provided at a substantially center of the inner periphery thereof with a circumferential groove 2a. The circumferential groove 2a functions to prevent the inner surface rubber 2 from bulging into a pipe line which conveys medium when the pipe joint is subjected to bending deformation. Reference numeral 3 illustrates a pair of spaced apart and opposed hard tubular bodies each formed of metal or the like and provided at its outer end with a flange 4 adapted to be connected to end flanges of the pipe line (not shown).

Reference numeral 5 shows a reinforcing layer formed of a cord, canvas or the like. The reinforcing layer 5 is superimposed about the outer periphery of the inner surface rubber 2. Each end of the reinforcing layer 5 is wound around a core ring 6 from its inside toward the outside thereof to form a turn-back portion which is bonded with the reinforcing layer 5. The core ring 6 is wound around the outer surface of the hard tubular body 3 and composed of metal wires. As a result, the reinforcing layer 5 is secured to both the inner surface rubber 2 and the hard tubular body 3. Reference numeral 7 designates an outer surface rubber formed of weather resistant rubber which together with the above mentioned inner surface rubber 2 and reinforcing layer 5 constitutes a cylindrical rubber body. The inner end portion of each hard tubular body 3 is embedded in the inner surface rubber 2.

In the present embodiment, each hard tubular body 3 is provided at that position thereof which is distant apart from its inner end in the axial direction, but nearer thereto than the inner end of the turn-back portion of the reinforcing layer 5 with a circumferential rib 8 protruding outwardly from the hard tubular body 3 in the radial direction. The circumferential rib 8 may be annular or divided into circumferential segments and secured to the hard tubular body 3 by welding or the like process. In addition, each hard tubular body 3 is provided at that position thereof which is adjacent to the inside surface 8a of the circumferential rib 8 with a circumferential reinforcing member 9. The reinforcing member 9 is embedded in that portion of the inner surface rubber 2 which is defined by the outer surface of the tubular body 3, a plane vertically extending from the inner end of the tubular body 3 and the reinforcing layer 5. The circumferential reinforcing member 9 may be annular or divided into circumferential sections and formed of fibrous cord, steel cord, metal ring, wire or chain or the like.

Figure 2:
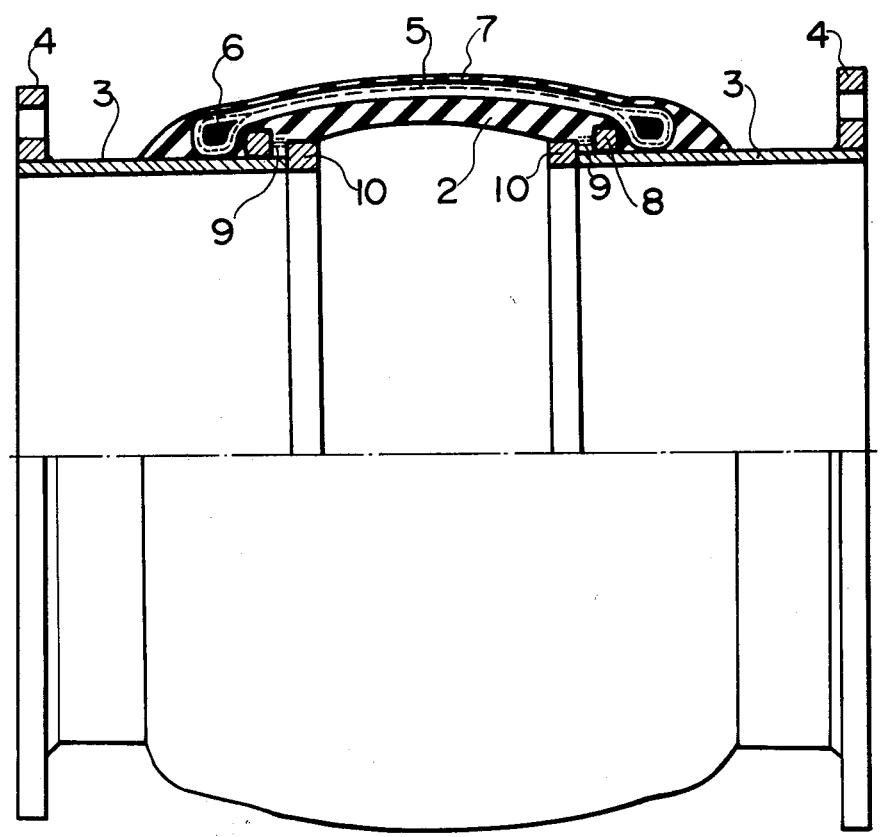
FIGS. 2 to 4 are partial cross-sectional views of second to fourth embodiments of a flexible pipe joint according to the invention.

FIG. 2 shows a second embodiment of a flexible pipe joint according to the invention. In the previous embodiment shown in FIG. 1, the inner end portion of the hard tubular body 3 is embedded in the inner surface rubber 2. In the present embodiment, however, only the outer surface of the inner end portion of one hard tubular body 3 is connected through the inner surface rubber 2 to the outer surface of the inner end portion of the other hard tubular body 3. In addition, each hard tubular body 3 is provided at its inner end with a reinforced annular member 10 secured thereto and having an outer diameter which is larger than the outer diameter of the hard tubular body 3. The reinforced annular member 10 serves to improve the wear resistance property of the flexible pipe joint according to the invention. The reinforced annular member 10 may preferably be formed of an iron alloy containing chromium or the like metal element.

Figure 3:
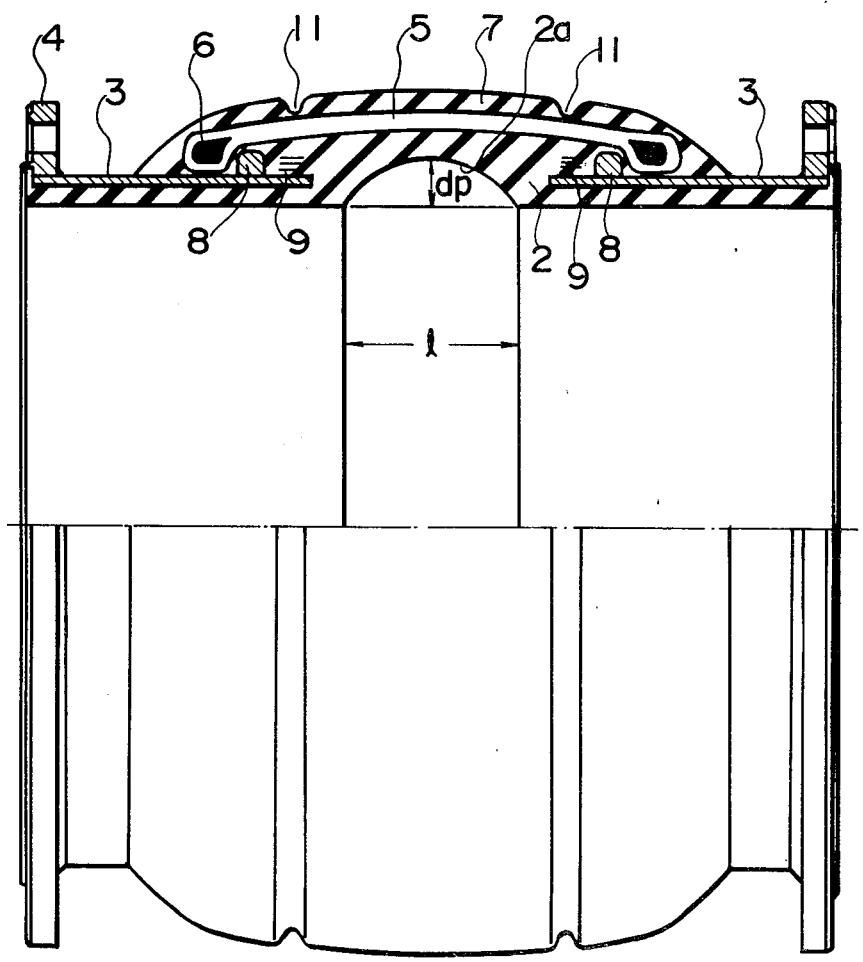

FIG. 3 shows a third embodiment of a flexible pipe joint according to the invention. In the present embodiment, the circumferential groove 2a provided at the substantially center of the inner periphery of the inner surface rubber 2 is made arcuate in section and has a depth dp which is preferably about ⅛ of a width 1 thereof. In addition, the outer surface rubber 7 is provided at its outer periphery with annular grooves 11, 11 symmetrically located with respect to a center plane extending in a radial direction of the flexible pipe joint at positions each slightly displaced outwardly from the inner end of the hard tubular body 3. These annular grooves 11, 11 cause the outer surface rubber 7 to bend toward the inner surface rubber 2 when the flexible pipe joint is bent, thereby decreasing strain to which that portion of the inner surface rubber 2 adjacent to the inner end of the hard tubular body 3 is subjected.

Figure 4:
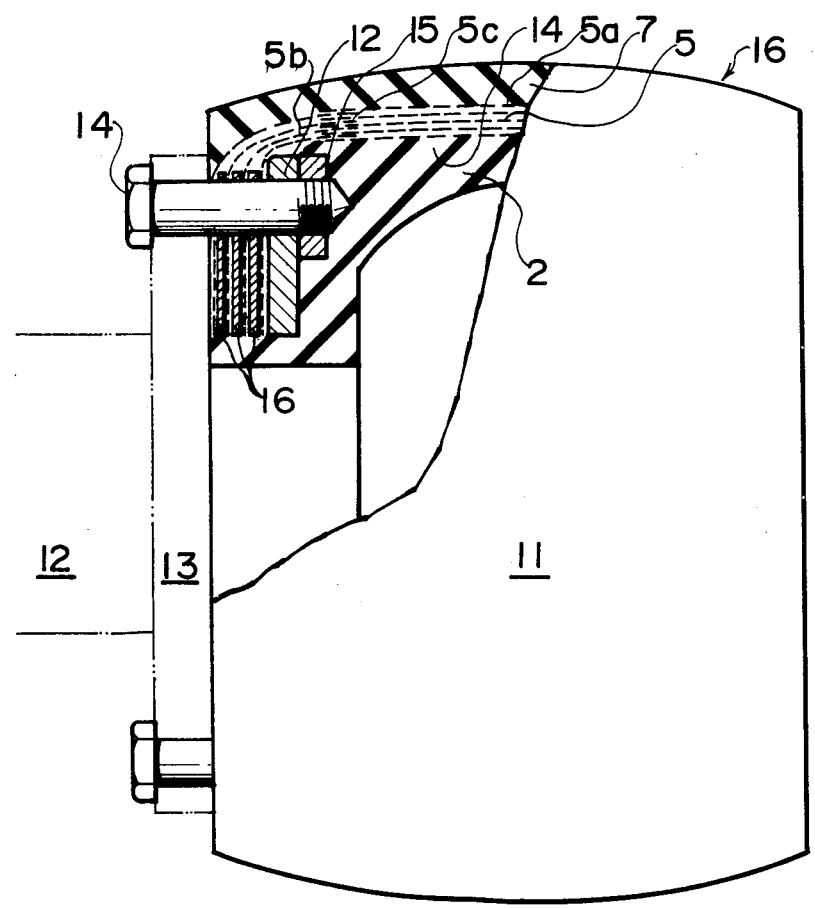

FIG. 4 shows a fourth embodiment of a flexible pipe joint according to the invention. In the present embodiment, the cylindrical rubber body composed of the outer surface rubber 7, inner surface rubber 2 and reinforcing layer 5 is provided at its axial end with an annular body 12 concentrically arranged with the cylindrical rubber body and provided with a plurality of equidistantly spaced apart and circumferentially arranged holes.

These holes may be tapped and threadedly engaged with bolts 14 extending through a flange 13 used instead of the hard tubular body 3 provided with the flange 4. Alternatively, these holes may be plain bore holes. In this case a female screw threaded member 15 is secured to the inside of the annular body 12 and is threadedly engaged with the bolt 14.

In the present embodiment, the reinforcing layer 5 is composed of a plurality of canvases. The end portion of each canvas is bent along the outside of the annular body 12 toward the inner periphery of the cylindrical rubber body. Between the end portions of two adjacent canvases is sandwiched an auxiliary ring 16 concentrically arranged with the cylindrical rubber body. Each auxiliary ring 16 is formed of iron and has a thickness of about 3 to 5 mm. Each auxiliary ring 16 is provided with a plurality of holes through which the bolts 14 are extended which threadedly engage with the annular body 12 or female screw threaded member 15.

The reinforcing layer 5 composed of a plurality of canvases is divided into a central portion 5a and end portions 5b, 5b, these central and end portions being overlapped one upon the other for a width of 2 to 3 cm at a position 5c where the reinforcing layer 5 begins to bend. It is a matter of course that use may be made of one integral reinforcing layer 5.

As stated hereinbefore, the flexible pipe joint according to the invention is capable of increasing the force of the inner surface rubber 2 for preventing it from separating from the hard tubular body 3, 13 and is capable of causing the reinforcing layer 5 to hold the cylindrical rubber body therebetween, and as a result, there is no risk of the cylindrical rubber body being separated from the flexible pipe joint at a position located at the compressed side surface, particularly near the inner end of the hard tubular body 3.

If the internal pressure to which the flexible pipe joint is subjected causes it to expand or become displaced in its axial direction, the inside surface 8a of the rib 8 and the hard tubular body 3 can hold the reinforcing layer 5 at a given position in the inner surface rubber 2.

In the second embodiment of the flexible pipe joint according to the invention shown in FIG. 2, provision is made for the reinforced annular member 10 at the inner end of the hard tubular body 3 where there is a risk of the inner surface rubber 3 being suddenly worn by its deformation due to frequent collisions with the conveying medium inclusive of sharp edged crushed stones. The reinforced annular member 10 functions to alleviate damage to the hard tubular body 3, prevent the inner surface rubber 2 from being subjected to excessive strain, prevent the crushed stones from impinging upon the inner surface rubber 2 and hence significantly decrease the wear of the inner surface rubber 2 and prevent the inner surface rubber 2 from separating at the inner end of the hard tubular body 3, thereby significantly improving the durability of this kind of flexible pipe joint.

Figure 5:
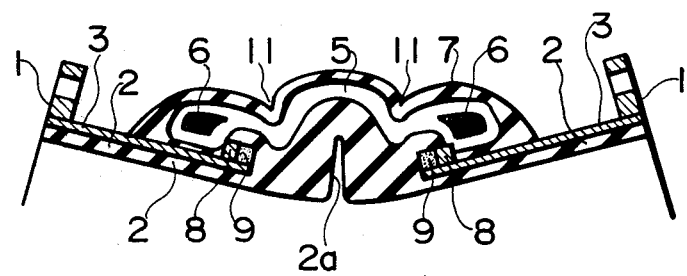
FIG. 5 is a fragmentary cross-sectional view of the embodiment shown in FIG. 3 showing a compression side thereof when it is subjected to a bending deformation.

In the third embodiment of the flexible pipe joint according to the invention shown in FIG. 3, the circumferential groove 2a provided in the inner surface rubber 2 functions to prevent the inner surface rubber 2 from bulging toward the conveying passage when the flexible pipe joint is subjected to the bending deformation as shown in FIG. 5. In addition, the annular grooves 11 provided in the outer surface rubber 7 cause the outer surface rubber 7 to bend toward the inner surface rubber 2 as shown in FIG. 5 and hence function to decrease the strain produced in the inner surface rubber 2 at a position near the inner end of the hard tubular body 3.

In the fourth embodiment of the flexible joint pipe according to the invention shown in FIG. 4, when connected to the end flanges of the pipe line, neither the annular body 12 nor the auxiliary rings 16 embedded in the inner surface rubber 2 make contact with the sea water or the like and hence there is no risk of the annular body 12 or the auxiliary rings 16 being corroded by the sea water or the like. In addition, the use of the auxiliary rings 16 in fastening the end portion of the reinforcing layer 5 by means of the bolt 14 provides the important advantage that the end portion of the reinforcing layer 5 can positively be maintained at its initial position irrespective of the presence or absence of internal pressure applied in the flexible pipe joint and that there is no risk of the end portion of the reinforcing layer 5 being separated from the inner surface rubber 2.

When internal pressure is applied in the flexible pipe joint, the end portions of the reinforcing layer 5 function to prevent one of two opposed end portions of the flexible pipe joint from approaching the other end portion. In addition, the central portion of the reinforcing layer 5 functions to prevent the central portion of the flexible pipe joint per se from protruding in the circumferential direction. As a result, excellent reinforcement of the flexible joint pipe is possible.

In the fourth embodiment shown in FIG. 4, the metal tubular body with the flange which has been required for the conventional flexible pipe joint is omitted and a single annular body corresponding to the flange and a bolt for connecting the flexible pipe joint to the end flanges of the pipe line are used. As a result, it is possible to provide a flexible pipe joint which is light in weight, easy to transport and handle, has a greater amount of rubber at the central portion than that for the overall length of the pipe joint, and is highly flexible and can absorb the displacement of adjacent pipe line.

What is claimed is:

1. A flexible pipe joint comprising a pair of spaced apart and opposed hard tubular bodies having a smooth cylindrical outer surface near the inner end thereof, a cylindrical rubber body including a reinforcing layer embedded therein and connecting said pair of hard tubular bodies with each other, a circumferential rib projecting outwardly in a radial direction from that portion of each of said hard tubular body which is separated outwardly in the axial direction from the inner end of said hard tubular body, and circumferential reinforcing means embedded in that position of said cylindrical rubber body which is surrounded by the inside surface of said circumferential rib, the outer smooth cylindrical surface of said hard tubular body, a vertical plane passing the inner end of said hard tubular body and said reinforcing layer.

2. The flexible pipe joint according to claim 1, wherein said circumferential rib is fixedly secured to said hard tubular body.

3. The flexible pipe joint according to claim 1, wherein said hard tubular body is provided at its inner end with a reinforced annular member opposed to medium to be conveyed through the flexible pipe joint to improve the wear resistance property.

4. The flexible pipe joint according to claim 3, wherein said reinforced annular member is secured to said hard tubular body and has an outer diameter which is larger than that of said hard tubular body, said reinforced annular member being formed of an iron alloy containing at least one hardness-increasing metal such as chromium.

5. The flexible pipe joint according to claim 1, wherein said cylindrical rubber body is provided at its inner peripheral surface with a circumferential groove.

6. The flexible pipe joint according to claim 5, wherein said circumferential groove is made arcuate in section and has a depth which is about one half of a width thereof.

7. The flexible pipe joint according to claim 1, wherein said cylindrical rubber body is provided at its outer peripheral surface with at least one circumferential groove formed as a decrease in thickness of said cylindrical rubber body.

8. The flexible pipe joint according to claim 7, wherein a plurality of said annular grooves are symmetrically located with respect to a center plane extending in a radial direction of the flexible pipe joint at positions each slightly displaced outwardly from the inner end of said hard tubular body.

9. The flexible pipe joint comprising a cylindrical rubber body including a reinforcing layer embedded therein and extending from one end portion of the flexible pipe joint to the other end portion, an annular body arranged at each end portion of the flexible pipe joint and having a plurality of holes therethrough, and auxiliary rings including a plurality of holes each adapted to receive a bolt, the end portion of said reinforcing layer being bent around the radially outward periphery of said annular body toward the radially inward periphery thereof and clamped between said auxiliary ring and said annular body by a plurality of bolts extending therethrough.

10. A flexible pipe joint according to claim 9, wherein said reinforcing layer comprises multiple strata and further comprising a plurality of auxiliary rings, wherein said multiple strata of said reinforcing layer are interleaved with said auxiliary rings and clamped therebetween by a plurality of bolts extending therethrough.

11. A flexible pipe joint according to claim 9, wherein said auxiliary ring and said annular body are embedded in said rubber body.

* * * * *